Figure 1:
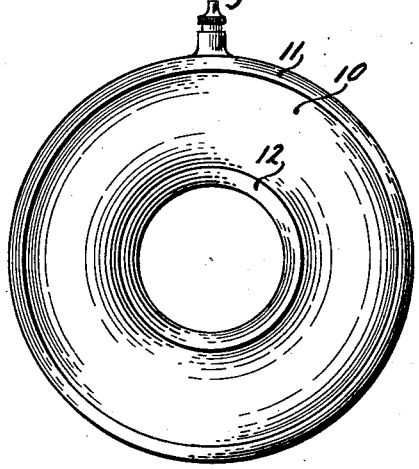

July 5, 1927.

W. N. AMORY 1,634,895

RESILIENT SUPPORT FOR VEHICLE BODIES

Original Filed Aug. 5, 1921  2 Sheets-Sheet 1

William N. Amory
INVENTOR

BY
ATTORNEY

July 5, 1927.

W. N. AMORY 1,634,895

RESILIENT SUPPORT FOR VEHICLE BODIES

Original Filed Aug. 5, 1921  2 Sheets-Sheet 2

William N. Amory
Inventor

By his Attorney

Patented July 5, 1927.

1,634,895

UNITED STATES PATENT OFFICE.

WILLIAM N. AMORY, OF NEW YORK, N. Y., ASSIGNOR TO ARCH-CUSHION CORPORATION, A CORPORATION OF NEW YORK.

RESILIENT SUPPORT FOR VEHICLE BODIES.

Application filed August 5, 1921, Serial No. 490,081. Renewed March 23, 1927.

The present invention relates particularly to an improved substitute for the metal springs heretofore commonly used in vehicles of all kinds, and more especially in automobiles and aeroplanes, which by reason of their weight and speed, are peculiarly liable to damage from shocks transmitted through the wheels.

It has long been recognized that the metallic leaf springs used for the support of road vehicles cannot be used with comfort or security, save in connection with auxiliary devices, known as "shock absorbers," which serve to restrain their tendency to produce wide swinging movements up and down in response to the shocks which they are intended to provide against.

Among the various devices proposed as shock absorbers are distendible pneumatic cushions, generally made of rubber and fabric. All of these depend upon the elasticity of the contained air under high pressure, and upon the distension of the resilient walls of the cushions, under the influence of the air pressure.

I have discovered that it is possible so to use a specially constructed pneumatic cushion as a substitute for the usual metallic springs that all discomfort from road shocks is suppressed without any of the wide swinging movements of steel springs and yet without employing auxiliary devices or "shock absorbers."

In order to do this, I depart entirely from the older practice of using large distendible cushions containing highly compressed air, and resort instead to a small cushion of such a form as to afford a substantial resilient supporting arch. Cushions 6 inches in diameter and but 1¼ inch in height have been found to be of sufficient size and capacity for motor cars weighing over 5000 pounds. This arch, without any aid from compressed air, is calculated to support the dead weight of the vehicle body when at rest in a condition of sensitive resilient equilibrium. Having provided for this condition, a very slight additional support is made to lift the car by the use of a few pounds compression of air which distends the upper and lower surfaces of the cushion a slight distance. This lifting is so slight that, under the influence of road shocks the action of the cushion is always largely the result of the resilience of the flexible substantial arch, while the compressed air, far from wholly sustaining the weight of the vehicle, merely cooperates with the sturdy resilient arch to preserve a condition of equilibrium, at the same time absorbing and dissipating the incessant vibrations to which all wheel vehicles in motion are constantly subject, while intercepting and minimizing shocks incident to travel, and providing the utmost of security, protection and comfort to the vehicle and its occupants.

Figure 2:
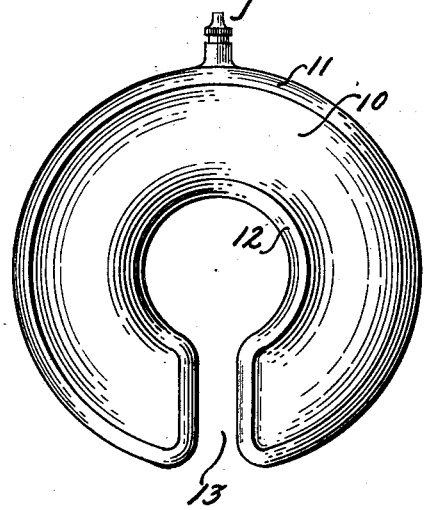
Figure 3:
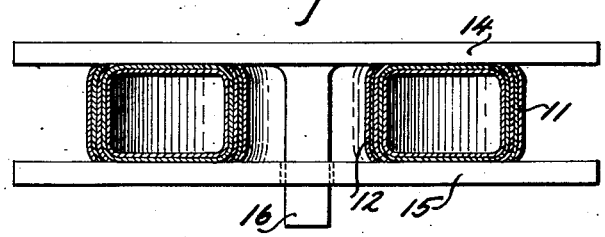
Figure 4:
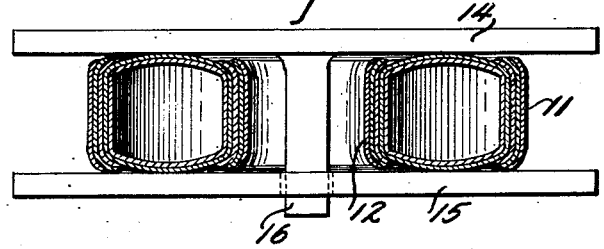
Figure 7:
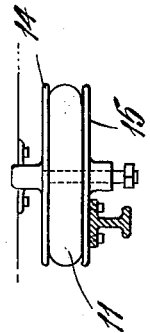
Figure 5:
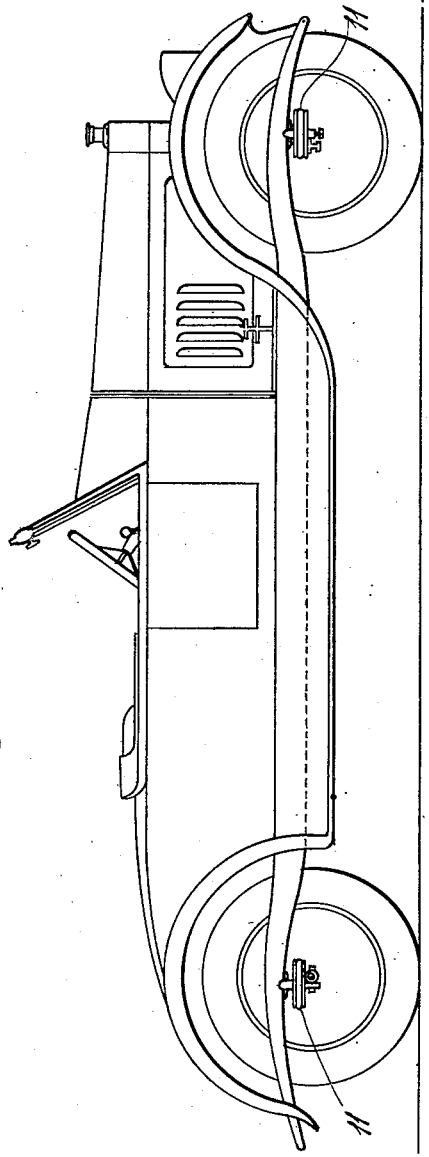
Figure 6:
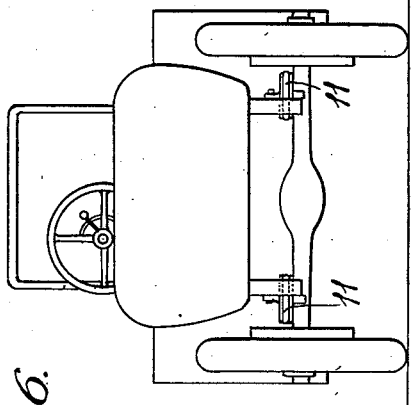

I have illustrated the invention in a preferred form in the accompanying drawings wherein Figure 1 is a plan view of my pneumatic arch, Figure 2 is a plan view of a modified form thereof, Figure 3 shows the arch in section as located between the pressure plates before distension, Figure 4 is a similar view of the same after distension, Figure 5 is a side elevation of a vehicle showing the preferred mode of use of the improved device, Figure 6 is an end view of a vehicle fitted with my improvement, and Figure 7 is an enlarged side elevation of the cushion and one form of mounting therefor.

The pneumatic arch takes the form of a cushion of rubber and fabric, much like a pneumatic tire with a protective tread, but laid so that the weight is supported upon the distendible sides instead of upon the periphery.

The distendible annular cushion 10, is stoutly reinforced with layers of fabric, around the cushion's outer circumference, as shown at 11, and this reinforcement may be, and preferably is, applied around the central hole of the annular cushion, as shown at 12. It has been found that two or three extra bands of fabric around the outer circumference and the central hole, vulcanized in and becoming a part of the cushion, are sufficient and adaptable for use upon the ordinary motor car.

In the form shown in Figure 2, the annulus is not completed, a space 13 being left to permit the cushion to be slipped into place around the spindle attached to one or the other pressure plate, as hereinafter described.

As indicated in Figure 5, the cushions take the places of the usual metal leaf springs, acting entirely to support the weight of the vehicle, and intercepting all road shocks without producing any violent swinging movements.

One simple method of assembling these pneumatic arches for the purpose described is to place each flatwise between an upper pressure plate 14 and a lower plate 15, connected respectively with the chassis and the axles of the wheels.

To center the whole and keep the plates over each other any well known means may be employed; as, for instance, a spindle (already mentioned) shown at 16. This may be attached to either pressure plate, passing through an opening in the other plate, and surrounded by the cushion 10 (or practically so).

The reinforcement of the cushion 10 is sufficiently stout to form the principal factor in a substantial resilient arch which is effective in carrying the entire weight of that part of the vehicle to which it is assigned. Owing to the resilient nature of this arch, the weight is held or balanced in a condition of sensitive equilibrium.

The position of the undistended arch as it carries the weight of the car at rest is shown in Figure 3. Before proceeding to use the device by starting the vehicle, however, an ordinary small bicycle hand pump is applied to the usual nipple 17 of the valve with which the cushion is equipped, and a few pounds of air pressure are applied by only two or three strokes of the pump. This is found sufficient to disturb the delicate resilient equilibrium, causing the car to rise slightly while the relatively thin upper and lower sides of the cushion are slightly distended, as shown in Figure 4. The outer wall, being sufficiently reinforced is not appreciably distended by this process.

I have found in practice that pneumatic arches of this character used in the manner described will have all the shock destroying effect of the best springs; with many advantages not possessed by steel springs and that no auxiliary devices are necessary to prevent wide and uncomfortable swinging.

It is to be understood that, although my improvement is principally important and effective as a complete substitute for vehicle springs, my claims (unless otherwise expressed) cover also the use of the invention in combination with springs.

What I claim is—

1. In combination with a vehicle, a number of hollow arched rubber cushions interposed between the axles or running gear and body in a manner to support the weight of the body, the material arch in each cushion being adequate to support its own proportion of the total weight without material assistance from air pressure.

2. In a vehicle a resilient supporting cushion having distendible sides and peripheral re-enforcement so stout as to provide an adequate substantial resilient arch for normal support of the vehicle body.

3. In a vehicle, a cushion of the character set forth in claim 2 sufficiently distended vertically to lift the vehicle body while not appreciably distended peripherally.

4. Apparatus as in claim 1 wherein the mounting of the vehicle body on the axles is springless save for the cushions as set forth in said claim.

5. In the combination set forth in claim 1, a hollow toric cushion having the characteristics set forth in said claim.

In testimony whereof I have hereto set my hand on this 3rd day of August, 1921.

WILLIAM N. AMORY.